United States Patent
Montagano et al.

(10) Patent No.: US 6,443,404 B1
(45) Date of Patent: Sep. 3, 2002

(54) CABLE RESTRAINING BRACKET

(75) Inventors: Antonio Montagano, San Jose; Scott Brian Beardsley, Union City; Christopher Scott Adams, San Jose, all of CA (US)

(73) Assignee: Berg Technology, Inc., Reno, NV (US)

( * ) Notice: Subject to any disclaimer, the term of this patent is extended or adjusted under 35 U.S.C. 154(b) by 0 days.

(21) Appl. No.: 09/668,192

(22) Filed: Sep. 22, 2000

(51) Int. Cl.[7] .................................................. F16L 3/08
(52) U.S. Cl. ............................ 248/74.5; 248/72; 248/73
(58) Field of Search ........................... 248/62, 72, 74.1, 248/74.3, 229.16, 220.1, 316.8, 57, 51, 74.5

(56) References Cited

U.S. PATENT DOCUMENTS

| | | | | |
|---|---|---|---|---|
| 499,549 A | * | 6/1893 | Hunter | 248/72 |
| 934,663 A | | 9/1909 | Folger | 248/74.5 |
| 1,352,895 A | * | 9/1920 | Hoffman | 248/72 |
| 1,943,766 A | * | 1/1934 | Macdonald | 403/398 |
| 3,582,030 A | * | 6/1971 | Barrett, Jr. | 24/73 |
| 3,802,655 A | * | 4/1974 | Schuplin | 248/74 R |
| 3,847,331 A | * | 11/1974 | Vallinotto et al. | 248/74.3 |
| 3,884,438 A | * | 5/1975 | Logsdon | 248/59 |
| 4,560,126 A | * | 12/1985 | Judkins | 248/72 |
| 4,679,123 A | | 7/1987 | Young | 361/428 |
| 5,154,375 A | * | 10/1992 | Condon | 248/73 |
| 5,188,318 A | | 2/1993 | Newcomer et al. | 248/68 |
| 5,230,488 A | * | 7/1993 | Condon | 248/73 |
| 5,236,158 A | * | 8/1993 | Condon | 248/73 |
| 5,297,890 A | | 3/1994 | Commins | 403/398 |
| 5,463,189 A | | 10/1995 | Deneke et al. | 174/138 |
| 5,868,362 A | | 2/1999 | Daoud | 248/71 |
| 5,929,381 A | | 7/1999 | Daoud | 174/72 |
| 5,964,434 A | | 10/1999 | Lynch, Jr. | 248/60 |

* cited by examiner

Primary Examiner—Anita King
Assistant Examiner—Gwendolyn Baxter
(74) Attorney, Agent, or Firm—Harrington & Smith, LLP

(57) ABSTRACT

A cable restraining bracket for restraining a cable relative to a frame. The bracket comprises a first leg section; a second leg section; and a loop section connecting the first and second leg sections to each other. The first and second leg sections each comprise a receiving area for receiving an edge of the frame therein and making a snap-lock attachment therewith. The loop section is resiliently deformable to locate the first and second leg sections at different positions relative to each other.

12 Claims, 1 Drawing Sheet

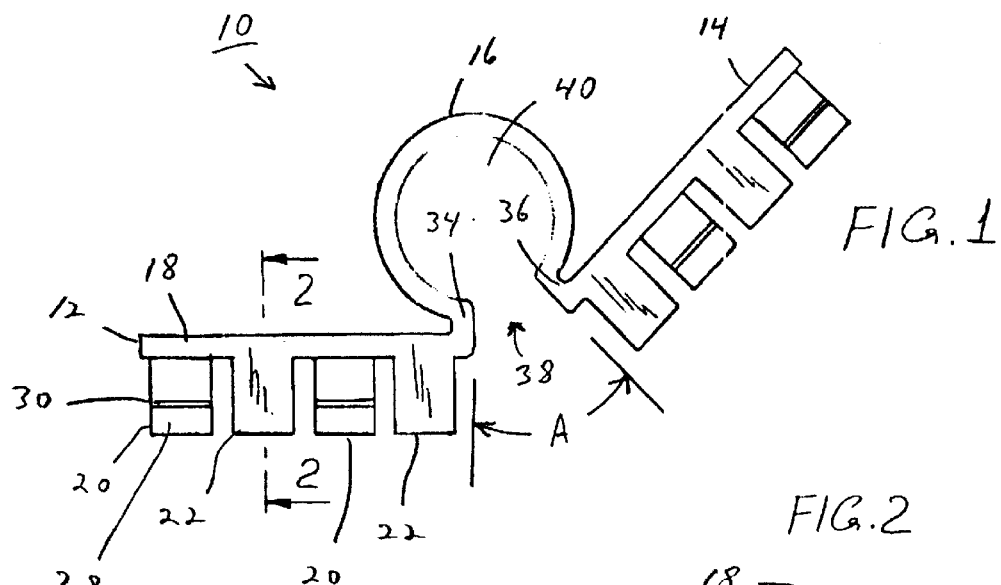
FIG. 1
FIG. 2
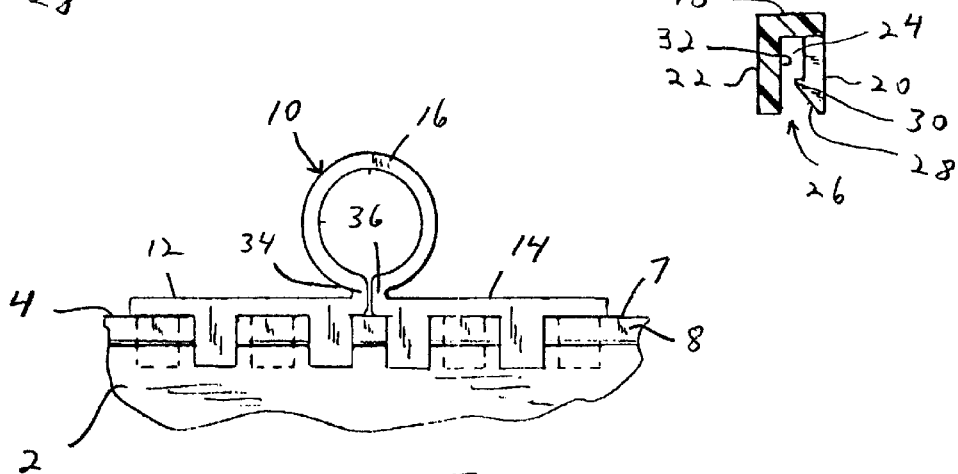
FIG. 3
fig. 2a
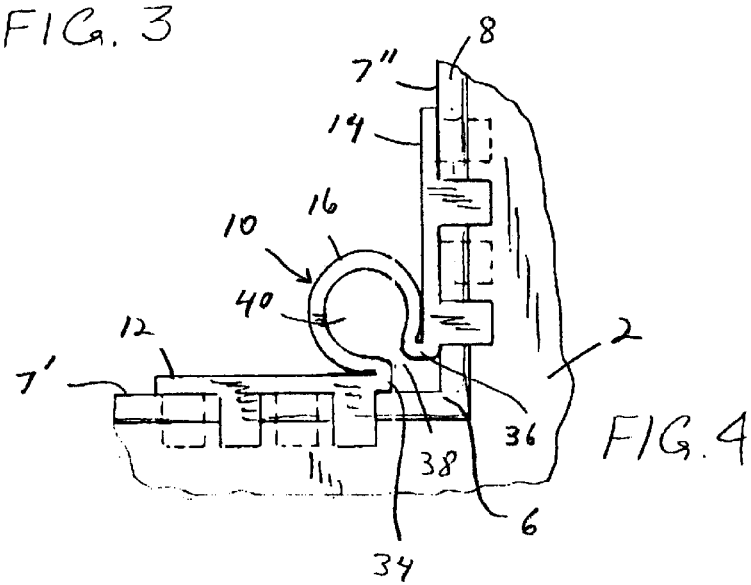
FIG. 4

CABLE RESTRAINING BRACKET

BACKGROUND OF THE INVENTION

1. Field of the Invention

The present invention relates to a restraint for an electrical conductor and, more particularly, to a bracket which can be attached to a frame.

2. Brief Description of Prior Developments

Electrical devices, such as computers, can be provided with brackets which attach to frames or chassis of the devices for restraining electrical conductors or wires (referred to herein as "cable" or "cables"). The cable restraints are primarily used to keep the cables away from other electrical components (to reduce radio frequency interference), to organize the cables for easier assembly and repair, and to prevent the cables from being damaged during assembly or repair. There is a need for a cable bracket which is relatively easy to attach to an electrical device chassis, can withstand a relatively high pull-out force, and which can be used in different chassis areas, such as on a straight edge of the chassis or on a corner of the chassis.

SUMMARY OF THE INVENTION

In accordance with one embodiment of the present invention, a cable restraining bracket is provided for restraining a cable relative to a frame. The bracket comprises a first leg section; a second leg section; and a loop section connecting the first and second leg sections to each other. The first and second leg sections each comprise a receiving area for receiving an edge of the frame therein and making a snap-lock attachment therewith. The loop section is resiliently deformable to locate the first and second leg sections at different positions relative to each other.

In accordance with another embodiment of the present invention, a cable restraining bracket for restraining a cable relative to a frame is provided comprising a mounting section for mounting the bracket to the frame; and a loop section connected to the mounting section. The bracket is reconfigurable to connect the mounting section to at least two different types of frame areas of the frame including a straight edge area or a corner angled edge area. The loop section has an opening at the mounting section which is blocked by the frame when the mounting section is connected to the frame.

BRIEF DESCRIPTION OF THE DRAWINGS

The foregoing aspects and other features of the present invention are explained in the following description, taken in connection with the accompanying drawings, wherein:

FIG. 1 is a front elevational view of a bracket incorporating features of the present invention;

FIG. 2 is a cross-sectional view of the bracket shown in FIG. 1 taken along line 2—2;

FIG. 2a is a cross-sectional view of a leg of an alternate embodiment of the present invention;

FIG. 3 is a rear elevational view of the bracket shown in FIG. 1 attached to a straight edge section of an electrical component frame; and FIG. 4 is a rear elevational view of the bracket shown in FIG. 1 attached to a corner section of an electrical component frame.

DETAILED DESCRIPTION OF THE PREFERRED EMBODIMENT

Referring to FIG. 1, there is shown a front elevational view of a cable restraining bracket 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used. The bracket 10 is preferably comprised of a one-piece member made of a molded resilient plastic or polymer material. However, the bracket could be comprised of multiple members and any suitable material(s) could be used. In the embodiment shown the bracket 10 comprises a first leg section 12, a second leg section 14, and a loop section 16. However, in alternate embodiments the bracket could have additional features. The loop section 16 is located between and connects the two leg sections 12, 14 to each other. In this embodiment the two leg sections 12, 14 are substantially mirror images of each other. However, in alternate embodiments the two leg sections 12, 14 could be different.

Referring also to FIG. 2, each leg section has a main section 18 and first and second projections 20, 22 extending off of the main section 18. In this embodiment the first projections 20 extend off of an opposite side of the main section 18 than the second projections 22.

In addition, the first and second projections 20, 22 are offset (i.e.: staggered) along the longitudinal length of the main section 18. Each leg section has two first projections 20 and two second projections 22. However, in alternate embodiments each leg section could have more or less than two first projections and two second projections. The leg sections 12, 14 each form a receiving area 24. The receiving areas are defined by the main section 18 at the top of the receiving area, the projections 20, 22 on opposite sides of the receiving area, and a substantially open bottom side 26 into the receiving area. The first projections 20 have a side facing the receiving area 24 which includes a ramp 28 and a snap-lock ledge 30. The second projections 22 have a substantially flat side 32 facing the receiving area 24 as shown in FIG. 2. In an alternate embodiment, such as FIG. 2a, one or both of the legs could have the projection 20 and a projection 22' could also include a snap-lock section. In other alternate embodiments, the inward facing sides of the projections 20, 22 could have any suitable shapes, or the leg sections could have any suitable type of retainment latching for connecting the leg sections to another member. In this embodiment the projections 20, 22 extend off of the main section 18 in a general cantilever fashion, and can resiliently deflect in a general cantilever fashion during placement on the chassis 2.

The loop section 16 has two ends 34, 36. The leg sections 12, 14 extend from the respective ends 34, 36 in a general cantilever fashion in general opposite directions. In the embodiment shown, the two ends 34, 36 are angled relative to each other at an angle A in a rest position. In a preferred embodiment the angle A is about 45° to about 60°. However, any suitable angle could be provided. The loop section 16 has a general circular ring shape with an opening 38 between the two ends 34, 36. In alternate embodiments the loop section could have any suitable open ended ring shape. The opening 38 allows cables to be inserted through the opening 38 into the central area 40 of the loop section. In a preferred embodiment the central area 40 can hold a cable having a diameter of about 0.5 inch. However, the loop section 16 could have any suitable size to hold any suitable size of cables. In a preferred embodiment the radius of the inner diameter of the loop section is about 0.375 inch, the leg sections are about 1.6 inches long, the projections are about 0.45 inches long, 0.28 inch wide and 0.1 inch thick, and the receiving area 24 is about 0.1 inch wide. However, any suitable dimensions could be provided. The loop section 16 can be resiliently deformed, with the angle A increasing or decreasing, to move the angular position of the leg sections relative to each other.

Referring also to FIGS. 3 and 4, the bracket 10 is shown connected to a chassis or frame 2 of a device, such as a computer. More specifically, FIG. 3 shows the bracket 10 attached to a straight edge section 4 of the chassis 2 and FIG. 4 shows the bracket 10 attached to a corner edge section 6 of the chassis 2. In these embodiments the chassis 2 is comprised of metal which has a section 8 bent back over itself at the outer edges 7. The leg sections 12, 14 are clipped or snap lock mounted on the outer edges 7. The outer edge 7 is inserted into the open bottom sides 26 of the receiving areas 24 with the snap-lock ledge 30 snapping behind the sections 8. The projections 20, 22 cooperate to sandwich the edge 7 in the receiving areas 24 with the ledge 30 adding additional retainment. In a preferred embodiment the bracket 10 can withstand a pull-off force of about 35 lbs. However, the bracket could be configured to provide any suitable pull-off force. Also, the bracket could mount to any other suitable structure on the chassis 2 (e.g.: at apertures through the chassis).

As seen in FIG. 3, the loop section 16 can be compressed to reduce the angle A to about 0° with the ends 34, 36 opposite each other. This results in the leg sections 12, 14 being moved in-line with each other to attach both leg sections 12, 14 to the straight edge section 4. If the ends 34, 36 do not totally block the opening 38, the opening is blocked by the edge 7. As seen in FIG. 4, the loop section 16 can be expanded to increase the angle A to about 90° to be mounted to the corner section 6. This results in the leg sections 12, 14 being located at an angle of about 90° relative to each other. The first leg section 12 is mounted on a first edge 7' and the second leg section 14 is mounted on a second edge 7". The two ends 34, 36 do no t contact each other, but the chassis 2 closes the opening 38 such that, even if a cable was to accidentally exit the area 40 through the opening 38, the cable would still be trapped between the bracket and the chassis.

The present invention provides a bracket for restraining a cable or cables which can be relatively inexpensively manufactured, such as by injection molding. The bracket is relatively easy to attach to a frame by merely being clipped onto an existing frame edge structure. The bracket can withstand relatively high pull-off force, such as about 35 lbs. The bracket can be used in at least two different mounting locations; straight or corner. Thus, one type of bracket can be manufactured for two types of mounting situations; thereby eliminating the need to manufacture two types of brackets for the two types of mounting situations. This can obviously save costs.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A cable restraining bracket for restraining a cable relative to a frame, the bracket comprising:

a first leg section;

a second leg section; and a cable receiving section through which the cable is adapted to extend, the cable receiving section connecting the first and second leg sections to each other, wherein the first and second leg sections each comprise a mounting area for engaging the frame, and wherein the loop section is resiliently deformable to locate the first and second leg sections at different positions relative to each other, and wherein the mounting area comprises at least one snap-lock attachment section.

2. A bracket as in claim 1 wherein the bracket is comprised of a one-piece member made of a molded polymer material.

3. A bracket as in claim 1 wherein the first and second leg sections extend in general cantilever fashion from opposite ends of the cable receiving section.

4. A bracket as in claim 1 wherein the first leg section comprises first and second projections forming a receiving area of the mounting area therebetween.

5. A bracket as in claim 4 wherein the second leg section is a substantial mirror image of the first leg section.

6. A cable restraining bracket for restraining a cable relative to a frame, the bracket comprising:

a first leg section;

a second leg section; and a cable receiving section through which the cable is adapted to extend, the cable receiving section connecting the first and second leg sections to each other, wherein the first and second leg sections each comprise a mounting area for engaging the frame, and wherein the cable receiving section is resiliently deformable to locate the first and second leg sections at different positions relative to each other, and wherein the first leg section comprises first and second projections forming a receiving area of the mounting area therebetween, and wherein the first and second projections are offset relative to each other along a longitudinal length of the first leg section.

7. A cable restraining bracket for restraining a cable relative to a frame, the bracket comprising:

a first leg section;

a second leg section; and a cable receiving section through which the cable is adapted to extend, the cable receiving section connecting the first and second leg sections to each other, wherein the first and second leg sections each comprise a mounting area for engaging the frame, and wherein the cable receiving section is resiliently deformable to locate the first and second leg sections at different positions relative to each other, and wherein the first leg section comprises first and second projections forming a receiving area of the mounting area therebetween, and wherein the first projection comprises a snap-lock latch ledge which extends into the receiving area.

8. A bracket as in claim 7 wherein the second leg projection comprises a flat side facing the receiving area.

9. A cable restraining bracket for restraining a cable relative to a frame, the bracket comprising:

a mounting section for mounting the bracket to the frame; and a cable receiving section connected to the mounting section;

wherein the bracket is reconfigurable to connect the mounting section to at least two different types of frame areas of the frame including a straight edge area or a corner angled edge area, wherein the cable receiving section has an opening at the mounting section which is blocked by the frame when the mounting section is connected to the frame, the mounting section comprises two leg sections, each leg section extending from an opposite end of the cable receiving section, the first leg section comprises first and second projections forming a frame receiving area therebetween, and wherein the first and second projections are offset relative to each other along a longitudinal length of the first leg section.

10. A bracket as in claim 9 wherein the first projection comprises a snap-lock latch ledge which extends into the receiving area.

11. A bracket as in claim 10 wherein the second projection comprises a flat side facing the receiving area.

12. A bracket as in claim 10 wherein a second leg section is a substantial mirror image of the first leg section.

\* \* \* \* \*